United States Patent [19]

Yokoo et al.

[11] Patent Number: 4,523,831
[45] Date of Patent: Jun. 18, 1985

[54] COPYING APPARATUS WITH OPENABLE UPPER HOUSING

[75] Inventors: Makoto Yokoo, Tokyo; Yoshitsugu Nakatomi, Yokohama; Shinichi Hashimoto, Fujisawa, all of Japan

[73] Assignee: Tokyo Shibaura Denki Kabushiki Kaisha, Japan

[21] Appl. No.: 379,045

[22] Filed: May 17, 1982

[30] Foreign Application Priority Data

May 18, 1981 [JP] Japan .................................. 56-74568

[51] Int. Cl.³ .......................................... G03G 15/00
[52] U.S. Cl. ................................................... 355/3 R
[58] Field of Search ....................... 355/3 R, 8, 11, 75, 355/133

[56] References Cited

U.S. PATENT DOCUMENTS 3,062,095 11/1962 Rutkus, Jr. et al. .......... 355/14 R X
3,743,406 7/1973 Komori et al. ........................ 355/8
3,993,406 11/1976 Zeuthen ................................ 355/8
4,040,387 8/1977 Washio et al. ...................... 118/658

FOREIGN PATENT DOCUMENTS 133744 10/1981 Japan .................................. 355/3 R Primary Examiner—A. T. Grimley
Assistant Examiner—J. Pendegrass
Attorney, Agent, or Firm—Cushman, Darby & Cushman

[57] ABSTRACT

A copying apparatus comprises a document table disposed on the top of a housing and having a glass platen on which an original document is to be laid, the glass platen being movable between a first position to cover the top of the housing and a second position to open the top over the length and breadth thereof, a copying mechanism disposed inside the housing to reproduce on a sheet of copying paper an image of the original document laid on the glass platen, and a protective member attached to the housing for covering the opening of the housing, having openings and being able to move between a third position and a fourth position. The protective member covers the upper portion of the copying mechanism while staying in the third position and the protective member exposes the upper portion of the copying mechanism while staying in the fourth position when the glass platen is in the second position.

13 Claims, 18 Drawing Figures

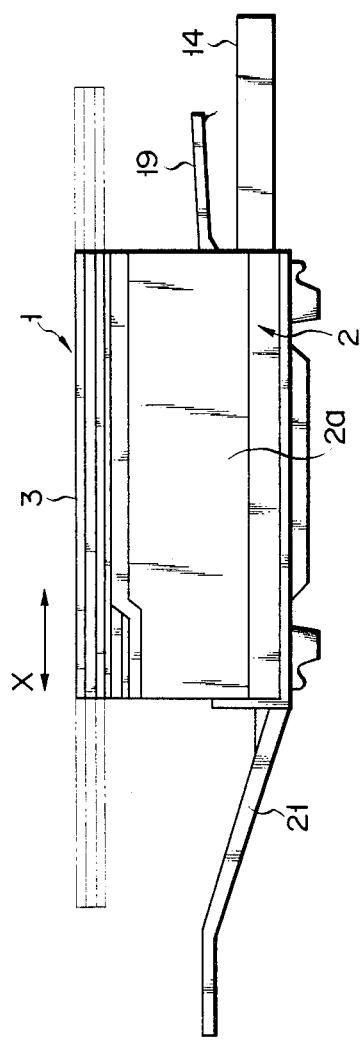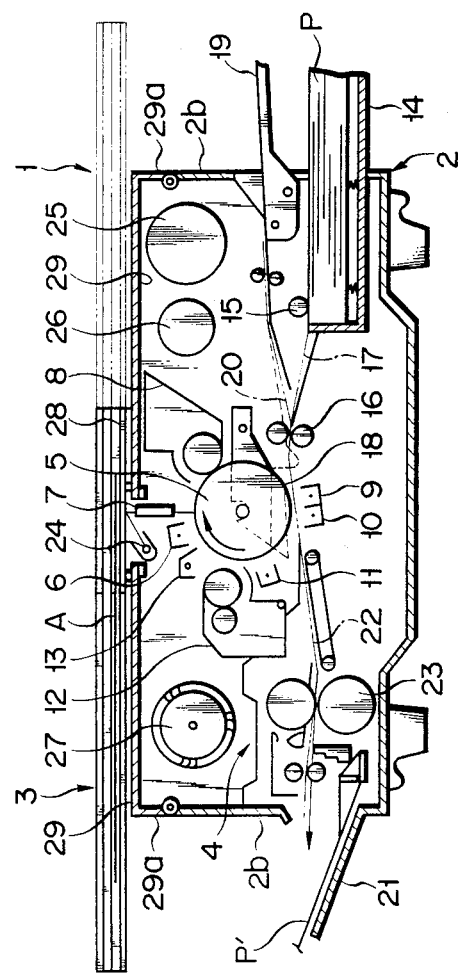
FIG. 1
FIG. 2

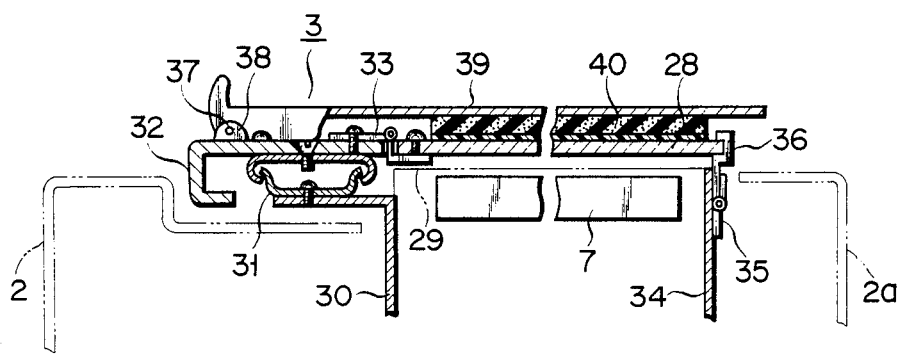
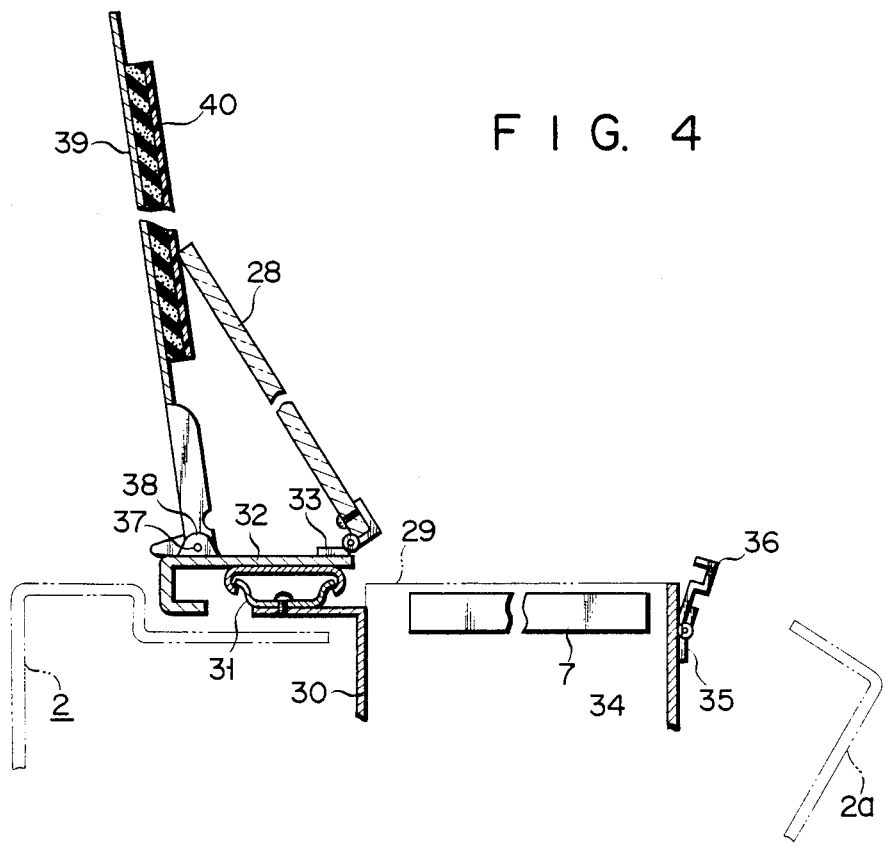

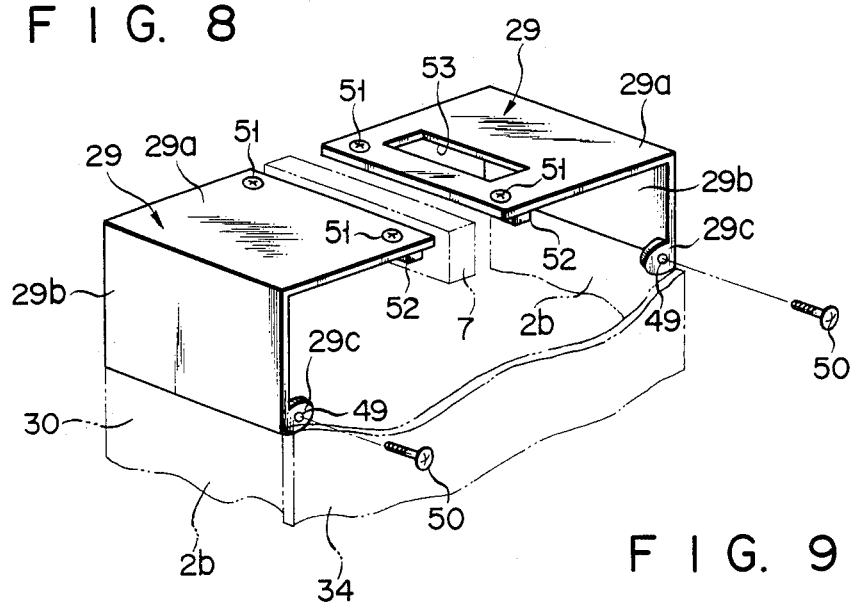
FIG. 8
FIG. 9
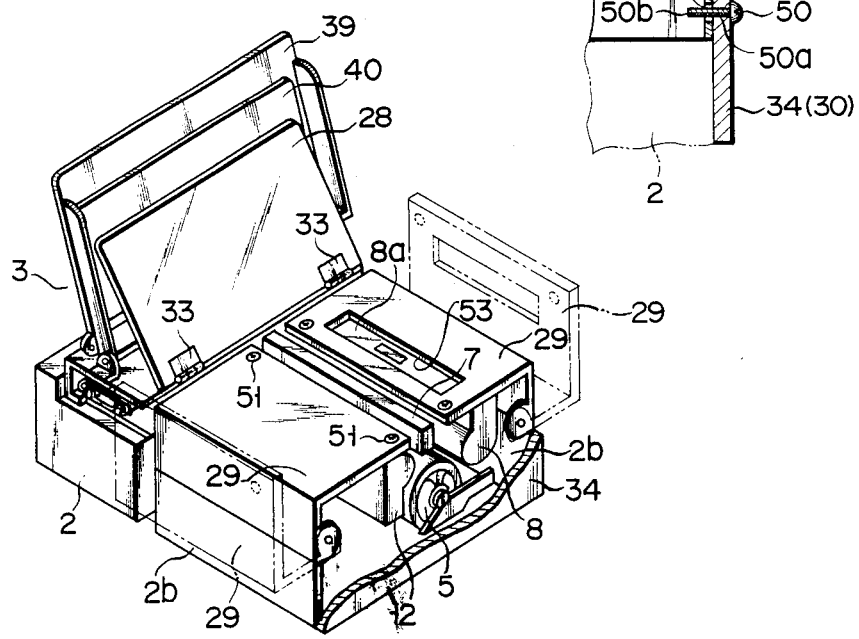
FIG. 10

COPYING APPARATUS WITH OPENABLE UPPER HOUSING

BACKGROUND OF THE INVENTION

The present invention relates to a copying apparatus provided with a mounting structure for movably mounting a glass platen of a document table.

Miniaturization of copying apparatus has recently been advanced. Accompanying such miniaturization, the arrangement density of various devices in a copying mechanism contained in a copying apparatus housing has inevitably been increased. Presently, therefore, it is impossible to carry out satisfactory maintenance, inspection, adjustment or replacement of an exposure lamp, Selfoc lens as an optical system for exposure, charger, cleaner, photosensitive drum, etc., by only displacing a front cover of the copying apparatus housing.

Conventionally, before performing the aforesaid various operations, the topside of the copying apparatus housing must be opened by first removing a glass platen of a document table on the topside of the housing, and then removing a protective cover which covers the greater part of the top of the housing.

In a prior art copying apparatus, however, the glass platen to bear an original document thereon is sustained on the document table, whether of a fixed type or of a movable type, with its peripheral portion held by a document table frame formed integrally with the copying apparatus housing or capable of reciprocating relatively to the housing, and by a pressing frame fixed to the document table frame by means of a number of screws.

Accordingly, attaching and detaching the glass platen and the protective cover are very troublesome, and besides, resetting of the glass platen and the protective cover may sometimes cause dislocation, which would require readjustment.

SUMMARY OF THE INVENTION

The present invention is contrived in consideration of the aforementioned circumstances, and is intended to provide a copying apparatus, in which a mounting structure for a glass platen of a document table is improved so that upper side face portion of a copying apparatus housing on which the glass platen is mounted may be easily opened and closed, thereby facilitating the maintenance, inspection, adjustment and replacement of a copying mechanism contained in the copying apparatus housing.

According to an aspect of the present invention, there is provided a copying apparatus which comprises a housing having an opening at the top, a document table disposed on the top of the housing and having a glass platen on which an original document is to be laid, the glass platen being movable between a first position to cover the top of the housing and a second position to open the top over the length and breadth thereof, a copying mechanism disposed inside the housing to reproduce on a sheet of copying paper an image of the original document laid on the glass platen, and a protective member attached to the housing for covering the opening of the housing, having opening means and being able to move between a third position and a fourth position, the protective member except for the opening means covering the upper portion of the copying mechanism while staying in the third position and the protective member exposing the upper portion of the copying mechanism while staying in the fourth position when the glass platen is in the second position.

BRIEF DESCRIPTION OF THE DRAWINGS

FIG. 1 is a front view showing one embodiment of a copying apparatus according to the present invention;

FIG. 2 is a front sectional view schematically showing the internal mechanism of the apparatus of FIG. 1;

FIG. 3 is a side sectional view of a document table;

FIG. 4 is a side sectional view of the document table of FIG. 3, in which a cover and a glass platen are swung open;

FIG. 8 is a perspective view showing protective covers;

FIG. 9 is a side sectional view of a pivotal section of a protective cover;

FIG. 10 is a perspective view for illustrating the relationship between the protective covers and the glass platen in a rocked position;

DETAILED DESCRIPTION OF THE PREFERRED EMBODIMENT

Figure 5:
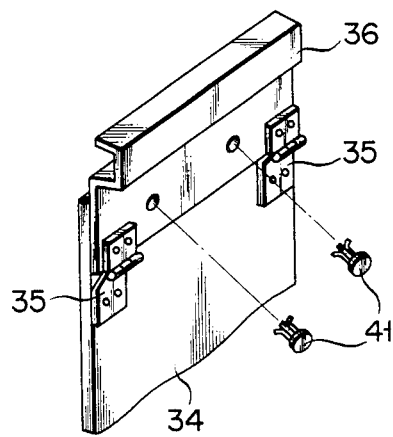
FIG. 5 is a perspective view of a guide rail to support the free end of the glass platen.

Referring now to the accompanying drawings of FIGS. 1 to 10, there will be described in detail one embodiment of a copying apparatus according to the present invention.

In FIG. 1, a copying apparatus 1 has a box-shaped copying apparatus housing 2 whose upper portions opened. Disposed on the topside of the housing 2 is a document table 3 which can reciprocate along the horizontal direction (indicated by arrow X) of FIG. 1. As shown in FIG. 2, the housing 2 contains therein a copying mechanism 4 which scans an original document A laid on the document table 3, reproduces an original document image on a sheet of copying paper P, and discharges the copied sheet P' to the outside of the housing 2 after the reproduction or copying. Disposed substantially at the central portion of the inside space of the housing 2 is a photosensitive drum 5 which rotates in the clockwise direction of FIG. 2. Surrounding the photosensitive drum 5, a charger 6, convergent light transmitting body (Selfoc lens) 7 as an optical system for exposure, developing device 8, transfer device 9, separator 10, de-electrifier 11, cleaner 12, and afterimage erasing lamp 13 are arranged successively along the rotating direction of the photosensitive drum 5. The convergent light transmitting body 7 is located right over the photosensitive drum 5 so that the bottom end face (light emitting face) of the former faces the top portion of the latter, while the separator 10 faces the bottom portion of the photosensitive drum 5.

A paper cassette 14 is detachably attached to the right side portion of the housing 2. Sheets of copying paper P stored in the paper cassette 14 are taken out one by one therefrom by the use of a paper supply roller 15. The paper P from the paper cassette 14 is led to a transfer section 18 between the photosensitive drum 5 and the transfer device 9 through a paper feeding path 17 in the middle of which lie a pair of feed rollers 16. A paper guide 19 for manual paper supply is attached to the right side portion of the housing 2 over the paper cassette 14. A sheet of copying paper P manually fed along the paper guide 19 is led to the transfer section 18 through a paper feeding path 20 for manual paper supply which joins the paper feeding path 17 at a point on the right (in FIG. 2) of the feed rollers 16.

A tray 21 is attached to the left side portion of the housing 2. After copying, the copied paper P' passed through the transfer section 18 is led onto the tray 21 through a paper delivery path 22. A fixing device 23 lies in the middle of the paper delivery path 22. The fixing device 23 is intended to fix a toner image on the paper P' after copying. In FIG. 2, there are also shown an exposure lamp 24 for lighting up the original document A, a motor 25 to serve as a driving source of a driving system, a reversing clutch 26 for reciprocating the document table 3, and a cooling fan 27.

There will now be described in brief the operation of the copying apparatus 1 of the above-mentioned construction. When a copying button (not shown) is depressed, the photosensitive drum 5 starts rotating, and a photosensitive layer on the photosensitive drum 5 is charged uniformly by the charger 6. Then, the exposure lamp 24 glows, the document table 3 starts reciprocating, and the original document A is scanned. Reflected light from the original document A is projected on the top end face (light receiving end face) of the convergent light transmitting body 7 and emitted from the bottom end face (light emitting end face). The emitted reflected light is used to expose the surface of the photosensitive layer on the photosensitive drum 5. Then, an electrostatic latent image corresponding to the original document image is formed on the surface of the photosensitive layer on the photosensitive drum 5. The electrostatic latent image is developed with use of a toner by the developing device 8.

Simultaneously with the formation of the toner image on the photosensitive drum 5, the copying paper P, which is previously kept on stand-by while in contact with the pair of feed rollers 16 after it is taken out of the paper cassette 14 by the paper supply roller 15, is fed into the transfer section 18 accompanying the rotation of the feed rollers 16. At the transfer section 18, the toner image formed on the photosensitive drum 5 is transferred onto the copying paper P. After the transference, the paper P' is separated from the surface of the photosensitive drum 5 by the separator 10. The separated paper P' is carried through the paper delivery path 22, and the toner image is fixed on the paper P' by the fixing device 23.

After the toner image is transferred, the surface of the photosensitive drum 5 is cleaned by the de-electrifier 11, cleaner 12, and afterimage erasing lamp 13.

Thus, one cycle of copying operation is completed.

If necessary, the copying mechanism 4 contained in the housing 2 may undergo maintenance, inspection, adjustment, replacement of defective parts, etc. These operations are performed after opening the front portion of the housing 2 by pulling down the front cover 2a of the housing 2 toward you, or after opening the topside of the housing 2 by retreating therefrom a glass platen 28 of the document table 3 thereon and a pair of protective covers 29 which cover the greater part of the top portion of the housing 2.

The document table 3 is constructed as shown in FIGS. 3 and 4. A slide rail 31 is fixed to the top horizontal porton of a rear frame 30 erected inside the housing 2. A document table frame 32 is mounted to the slide rail 31 so as to be able to reciprocate along the direction normal to the drawing plane of FIG. 3 (direction indicated by arrow X in FIG. 1). The rear end edge portion (left end portion of FIG. 3) of the glass platen 28 is coupled to the front end edge portion (right end portion of FIG. 3) of the document table frame 32 by means of a pair of hinges 33. The glass platen 28 is rockably supported by means of the hinges 33 so that it may retreat from the top portion of the housing 2. A guide rail 36 is attached, by means of hinges 35, to the upper end edge of a front frame 34 erected inside the copying apparatus housing 2. The guide rail 36 supports the front end portion of the glass platen 28 horizontally and slidably. A pair of bearings 38 protrude from the document table frame 32, arranged along the direction indicated by arrow X of FIG. 1. Pivots 37 are supported severally by the bearings 38. A document presser cover 39 is rockably mounted on the pivots 37. A pad 40 composed of an elastic plate and a white sheet thereon is attached to that portion of the document presser cover 39 which faces the glass platen 28.

As shown in FIG. 5, the guide rail 36 to receive the front end edge portion of the glass platen 28 is fixed to the front frame 34 by means of a pair of latches 41 so as to be able to be disengaged as required. By the use of these latches 41, the guide rail 36 is prevented from unexpectedly rocking around the hinges 35.

Figure 6:
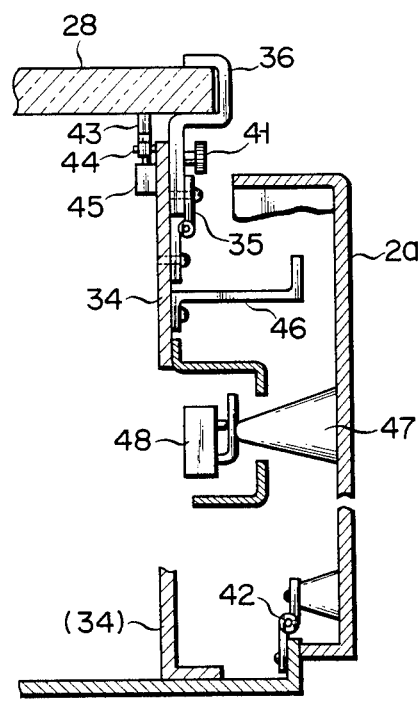
FIG. 6 is a side sectional view of a front cover in a mounted position.
Figure 7:
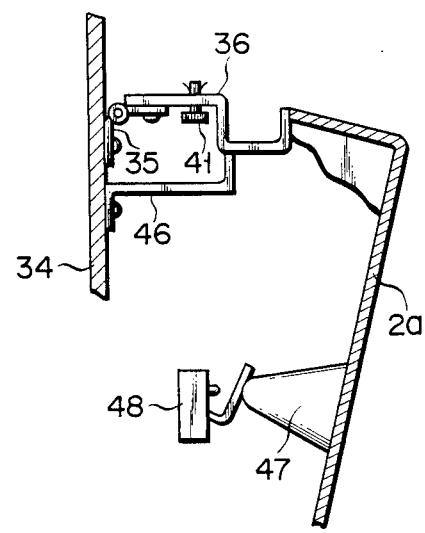
FIG. 7 is a side sectional view of the guide rail in a fallen position.

As shown in FIG. 6, the upper end portion of the front cover 2a of the housing 2 is located opposite to the lower portion of the guide rail 36. The front cover 2a can be pulled down toward you with the aid of hinges 42 attached to the lower end side thereof. By bringing down the front cover 2a, the guide rail 36 is allowed to be brought down toward you. Where the glass platen 28 is held by the guide rail 36, one end portion of a platen position detecting lever 43 is pressed by the under surface of the glass platen 28 to rock around a pivot 44. In this state, a first safety switch 45 is turned ON by the rocked or shifted lever 43. The safety switch 45 in the ON state enables the copying mechanism 4 to operate. If the glass platen 28 is swung open as shown in FIG. 4, on the other hand, the first safety switch 45 is turned OFF. The safety switch 45 in the OFF state disables the copying mechanism 4 from operating.

Where the guide rail 36 is fallen forward, as shown in FIG. 7, it is kept substantially horizontal by a stopper 46 which is attached to the front frame 34 below the guide rail 36. As long as the glass platen 28 is in the open position, therefore, the front cover 2a will never carelessly be put on fully to close the front portion of the housing 2, since the upper end edge portion of the front cover 2a will abut against the guide rail 36.

There is also provided a second safety switch 48 having an operating strip 47 which is pressed and displaced by the backside of the front cover 2a when the front cover 2a is put on. Where the front cover 2a is on, the safety switch 48 is turned ON by the operating strip 47 pushed in by the front cover 2a. The second safety switch 48 in the ON state enables the copying mechanism 4 to operate. When the front cover 2a is swung open, on the other hand, the operating strip 47 is kept from being pushed in, and the second safety switch 48 is turned OFF. The safety switch 48 in the OFF state disables the copying mechanism 4 from operating. Thus, the second safety switch 48 is prevented from being carelessly turned ON in the case where the glass platen 28 is off.

As shown in FIG. 8, each of the protective covers 29 is substantially L-shaped as viewed front ways, consisting of a horizontal portion 29a covering the greater part of the topside of the copying apparatus housing 2 except parts thereof, that is, those portions which face the top end face (light receiving end face) of the convergent light transmitting body 7 and a toner supply port of the developing device 8, and a vertical portion 29b extending from one end edge of the horizontal portion 29a at right angles thereto. The vertical portion 29b is located at the upper portion of each side portion 2b of the copying apparatus housing 2 to define each side face of the housing 2.

As shown in FIGS. 8 and 9, a pair of supporting parts 29c protrude severally from both end face sides of the vertical portion 29b of each protective cover 29. An aperture 49 is bored through each supporting part 29c, and a pivot screw 50 is passed through the aperture 49. The pivot screw 50 includes a shank portion 50a at the proximal part and a threaded portion 50b at the distal part. The threaded portions 50b of the paired screws 50 are screwed into the rear and front frames 30 and 34, severally. Each protective cover 29 is allowed to rock outwardly around the respective shank portions 50a of the screws 50. A pair of latches 51 are attached to distal end side portions of each protective cover 29. The latches 51 attached to each protective cover 29 can be fixed severally to a pair of rocking regulating members 52 so as to be able to be disengaged as required. An opening 53 for toner supply is formed in that portion of the right-hand protective cover 29 which faces the toner supply port closed by a cover 8a of the developing device 8.

In such copying apparatus 1, the top end face (light receiving end face) of the convergent light transmitting body 7 as the optical system for exposure or the under surface of the glass platen 28 may be soiled and require cleaning, or the developing device 8 may require resupply of toner. For such cleaning or resupply, the document presser cover 39 and the glass platen 28 of the document table 3 are swung backward, as shown in FIG. 10. For the maintenance, inspection, adjustment or replacement of the charger 6, convergent light transmitting body 7, photosensitive drum 5, cleaner 12, after-image erasing lamp 13, cooling fan 27, motor 25, reversing clutch 26, etc., the pair of protective covers 29 are rocked outward, as indicated by two-dot chain line in FIG. 10, to open the top portion of the copying apparatus housing 2.

The present invention is not limited to the construction of the above-mentioned embodiment, and various changes and modifications may be effected therein by one skilled in the art without departing from the scope or spirit of the invention. Several modifications will now be described in detail. In the description to follow, like reference numerals are used to designate the same portions as those included in the aforementioned one embodiment.

Figure 11:
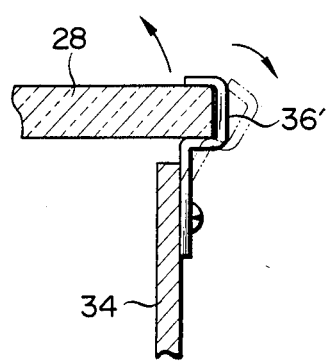
FIG. 11 is a sectional view showing a first modification of the guide rail shown in FIG. 5.

In the one embodiment, the guide rail 36 horizontally and slidably holding the front end edge portion of the glass platen 28 is attached to the front frame 34 by means of the pair of hinges 35. As shown as a first modification in FIG. 11, however, a guide rail 36' formed of a spring-like material may be attached directly to the front frame 34. The guide rail 36' can be elastically deformed as indicated by two-dot and dash line to allow the glass platen 28 to be swung open.

Figure 12A:
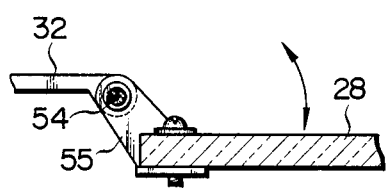
FIGS. 12A and 12B are side and front sectional views, respectively, showing a second modification of a glass platen mounting mechanism.
Figure 12B:
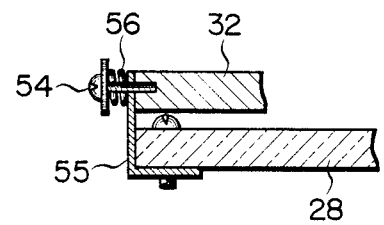

In the one embodiment, moreover, the glass platen 28 is rockably coupled to the document table frame 32 by means of the hinges 33. As shown as a second modification in FIGS. 12A and 12B, however, a pair of arms 55 may be rockably mounted on both end faces of the document table frame 32 by means of a pair of pivot pins 54 so that the glass platen 28 may be fixed to the free end side of each arm 55. In this case, a spring member 56, such as a compression coil spring or Belleville spring, is attached to each pivot pin 54 to press each arm 55 against the side end face of the document table frame 32. By a frictional force then produced between the document table frame 32 and the arms 55, the glass platen 28 is held in an optional rocking position.

Figure 13:
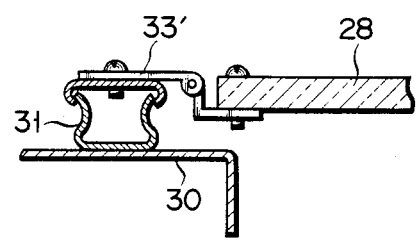
FIG. 13 is a side sectional view showing a third modification of the glass platen mounting mechanism.

Further, as shown as a third modification in FIG. 13, the glass platen 28 may be coupled to the slide rail 31 by means of a hinge 33' including an L-shaped movable block.

Figure 14:
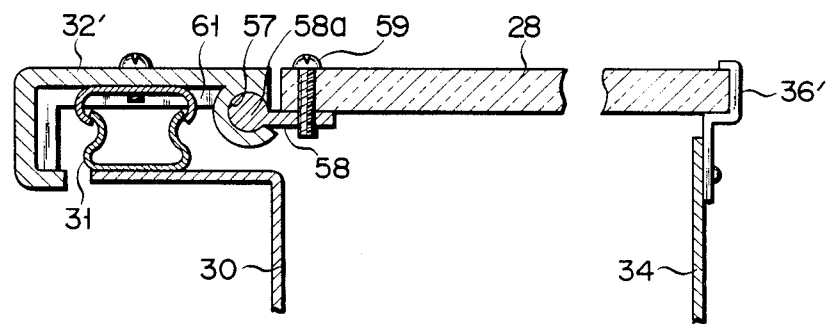
FIG. 14 is a side sectional view showing a fourth modification of the glass platen mounting mechanism.
Figure 15:
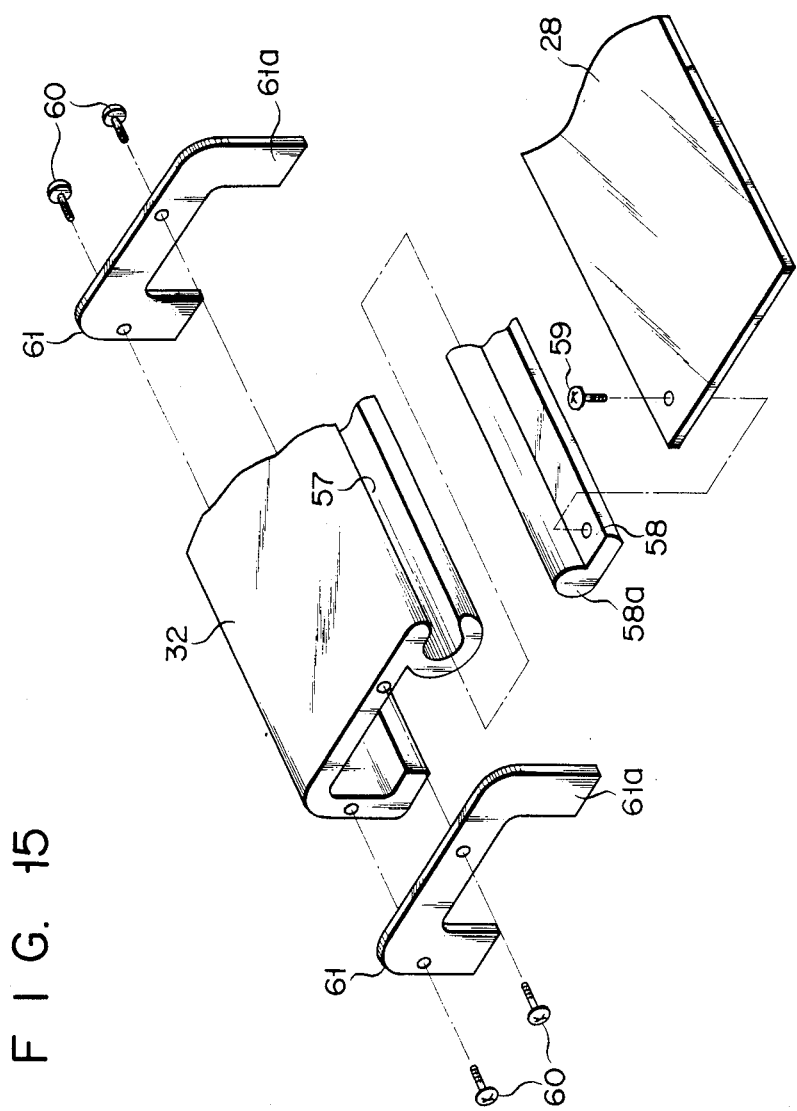
FIG. 15 is a disassembled perspective view of the principal part of the mounting mechanism shown in FIG. 14.

In the aforementioned one embodiment, furthermore, the glass platen 28 is retreated from the topside of the copying apparatus housing 2 by being rocked. As shown as a fourth modification in FIGS. 14 and 15, however, the glass platen 28 may be retreated from the topside of the copying apparatus housing 2 by being moved along the moving direction of the document table 3. In this case, a document table frame 32' has a guide groove 57 along its front end face. Also, a slider 58 having an engaging portion 58a to fit the guide groove 57 is slidably attached to the document table frame 32'. The glass platen 28 is fixed to the free end of the slider 58 by means of screws 59.

Figure 16:
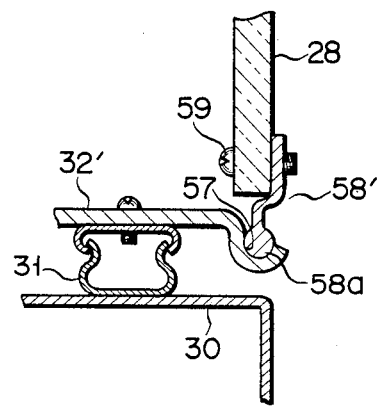
FIG. 16 is a side sectional view showing a fifth modification of the glass platen mounting mechanism.

As shown as a fifth modification in FIG. 16, furthermore, there may be used a slider 58' having an engaging portion 58a which is rockably fitted in the guide groove 57. With such construction, the glass platen 28 may be supported both rockably and slidably.

Figure 17:
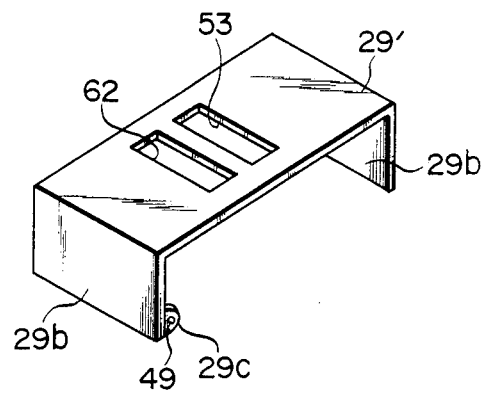
FIG. 17 is a perspective view showing a sixth modification of the protective cover shown in FIG. 8.

In the aforementioned one embodiment, moreover, the two protective covers 29 are provided in the form of a double door. As shown as a sixth modification in FIG. 17, however, a common protective cover 29' integrating the two protective covers may be used alternatively. The common protective cover 29' is pivotally mounted at one end portion. Formed in the top surface of the protective cover 29' are an opening 53 for toner supply and an opening 62 through which the top end face (light receiving end face) of the convergent light transmitting body 7 is exposed.

According to one embodiment of the present invention, as described in detail herein, the glass platen of the document table can be easily and securely retreated from the top portion of the copying apparatus housing. It is therefore easy to carry out the cleaning of the light receiving end face of the convergent light transmitting body as an optical system for exposure which is exposed to one side of the protective cover or covers, as well as of the under surface of the glass platen, and the resupply of toner to the developing device.

Since the glass platen can be easily retreated from the top portion of the copying apparatus housing, moreover, the topside of the housing can be opened relatively easily to facilitate the operations for maintenance, inspection, adjustment, replacement, etc. Moreover, the rockable and/or slidable setting of the glass platen greatly facilitates its positioning and movement.

What we claim is:

1. A copying apparatus which comprises:
   a housing having an opening at the top;
   a document table disposed on the top of the housing and having a glass platen on which an original document is to be laid, said document table being reciprocally movable in one direction between a first position wherein the document table fully covers the top of the housing and a second position wherein the document table partially covers the top of the housing, said document table being pivotal around an axis extending in said one direction between the first position and a third position wherein the top of the housing is fully opened;
   a copying mechanism disposed inside said housing to reproduce on a sheet of copying paper an image of the original document laid on the glass platen; and
   a protective member attached to the housing for protecting the copying mechanism, said protective member being pivotal around an axis perpendicular to said one direction between a first closed position wherein the protective member is located over the copying mechanism and a second opened position wherein the protective member fully exposes the copying mechanism when the document table is in the third position, wherein
   said protective member includes a single protective cover having a first section located over the copying mechanism and extending substantially horizontally, and second sections hanging severally from both end portions of the first section, a lower end of one of the second sections being pivotally mounted on the housing.

2. The copying apparatus according to claim 1, wherein said copying mechanism includes a developing device with a developer inlet port at the top and an exposure device for exposing the original document laid on the glass platen, and an opening formed in that portion of the first section which faces the developer inlet port and another opening to allow a light beam from the exposure device to be applied to the original document.

3. The copying apparatus according to claim 1, wherein both said second sections severally define parts of both side faces of the housing while the protective cover is in the first closed position thereof.

4. A copying apparatus which comprises:
   a housing having an opening at the top;
   a document table disposed on the top of the housing and having a glass platen on which an original document is to be laid, said document table being reciprocally movable in one direction between a first position wherein the document table fully covers the top of the housing and a second position wherein the document table partially covers the top of the housing, said document table being pivotal around an axis extending in said one direction between the first position and a third position wherein the top of the housing is fully opened;
   a copying mechanism disposed inside said housing to reproduce on a sheet of copying paper an image of the original document laid on the glass platen; and
   a protective member attached to the housing for protecting the copying mechanism, said protective member being pivotal around an axis perpendicular to said one direction between a third closed position where the protective member is located over the copying mechanism and a second opened position wherein the protective member fully exposes the copying mechansim when the document table is in the first position, wherein
   said protective member includes first and second protective covers severally pivotally mounted on said housing.

5. The copying apparatus according to claim 4, wherein each said protective cover includes a first section located over the copying mechanism and extending substantially horizontally, and a second section hanging from one end portion of the first section, the lower end of the second section being pivotally mounted on the housing.

6. The copying apparatus according to claim 5, wherein said copying mechanism includes a developing device with a developer inlet port at the top and an exposure device for exposing the original document laid on the glass platen, and said first protective cover is located over the developing device and an opening formed in that portion of the first section which faces the developer inlet port.

7. The copying apparatus according to claim 5, wherein said first and second protective covers are disposed at a predetermined space from each other, and a light beam from said exposure device is applied to the original document through said predetermined space.

8. The copying apparatus according to claim 5, wherein the respective second sections of said first and second protective covers severally define parts of both side faces of the housing while the protective covers are in the first closed position thereof.

9. A copying apparatus which comprises:
   a housing having an opening at the top;
   a document table disposed on the top of the housing and having a glass platen on which an original document is to be laid, said document table being reciprocally movable in one direction between a first position wherein the document table fully covers the top of the housing and a second position wherein the document table partially covers the top of the housing, said document table being pivotal around an axis extending in said one direction between the first position and a third position wherein the top of the housing is fully opened;
   a copying mechanism disposed inside said housing to reproduce on a sheet of copying paper an image of the original document laid on the glass platen; and
   a protective member attached to the housing for protecting the copying mechanism, said protective member being pivotal around an axis perpendicular to said one direction between a first closed position wherein the protective member is located over the copying mechanism and a second opened position wherein the protective member fully exposes the copying mechanism when the document table is in the third position, wherein said housing includes a front panel with a front opening, and a front cover attached to the front panel to move between a covering position where the front cover closes the front opening and an uncovering position where the front cover opens the front opening, and a guide rail attached to the front panel and supporting the front end portion of the glass platen horizontally and slidably.

10. The copying apparatus according to claim 9, which further comprising:
a first safety switch which is turned on by the glass platen when in the first position thereof and turned off when the glass platen is not in the first position, and wherein the first safety switch enables the copying mechanism to operate when in an on state.

11. The copying apparatus according to claim 9, wherein said guide rail is attached to the upper end edge of the front panel by means of hinges such that said guide rail is rotatably supported between a first position where the guide rail can support the glass platen and prevents the glass platen from moving from the first position thereof to the third position, and a second position where the guide rail allows the glass platen to move from the first position thereof to the third position.

12. The copying apparatus according to claim 11, which further comprises:
a second safety switch which is turned on by the front cover when in the first position and turned off when the front cover is not in the first position, and wherein the second safety switch enables the copying mechanism to operate when in an on state.

13. The copying apparatus, according to claim 12, wherein said guide rail in the second position abuts against the front cover to prevent the front cover from moving to the first position thereof.

* * * * *